(12) United States Patent
Cragun

(10) Patent No.: US 6,557,028 B2
(45) Date of Patent: Apr. 29, 2003

(54) METHOD AND COMPUTER PROGRAM PRODUCT FOR IMPLEMENTING COLLABORATIVE BOOKMARKS AND SYNCHRONIZED BOOKMARK LISTS

(75) Inventor: Brian John Cragun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/294,302

(22) Filed: Apr. 19, 1999

(65) Prior Publication Data

US 2003/0009521 A1 Jan. 9, 2003

(51) Int. Cl.$^7$ ............... G06F 15/16; G06F 7/00; G09G 5/00
(52) U.S. Cl. ............... 709/205; 709/202; 709/206; 709/207; 709/217; 709/246; 345/737; 345/738; 345/739; 707/10
(58) Field of Search ............... 709/202, 203, 709/204, 205, 206, 207, 217, 246; 345/329, 335, 739, 737, 738, 733; 707/10; 455/31.3

(56) References Cited

U.S. PATENT DOCUMENTS

| | | | | |
|---|---|---|---|---|
| 5,796,393 A | * | 8/1998 | MacNaughton et al. | 345/329 |
| 6,020,884 A | * | 2/2000 | MacNaughton et al. | 345/329 |
| 6,208,839 B1 | * | 3/2001 | Davani | 455/31.3 |
| 6,211,871 B1 | * | 4/2001 | Himmel et al. | 345/335 |
| 6,212,522 B1 | * | 4/2001 | Himmel et al. | 707/10 |
| 6,223,178 B1 | * | 4/2001 | Himmel et al. | 707/10 |
| 6,314,423 B1 | * | 11/2001 | Himmel et al. | 707/10 |
| 6,411,996 B1 | * | 6/2002 | Albers | 709/217 |

* cited by examiner

Primary Examiner—Kenneth R. Coulter
Assistant Examiner—Paul Kang
(74) Attorney, Agent, or Firm—Joan Pennington

(57) ABSTRACT

A method, apparatus and computer program product are provided for implementing collaborative bookmarks and synchronized bookmark lists. A bookmark list is created. User selected changes are identified and the bookmark list is updated. A bookmark list is received by a user. The received bookmark list and changed elements of the bookmark list can be automatically stored. A server can be used to maintain the collaborative bookmarks and synchronized bookmark lists. Alternatively, embedded update records can be created in e-mail and bookmark lists are synchronized by sending e-mail messages to each participant. Proposed changes are distributed to the participants for the bookmarks list. Nominated changes and approved changes are identified. Opinions of the participants are recorded, tallied and displayed. The bookmark list can be updated responsive to group approval.

28 Claims, 20 Drawing Sheets

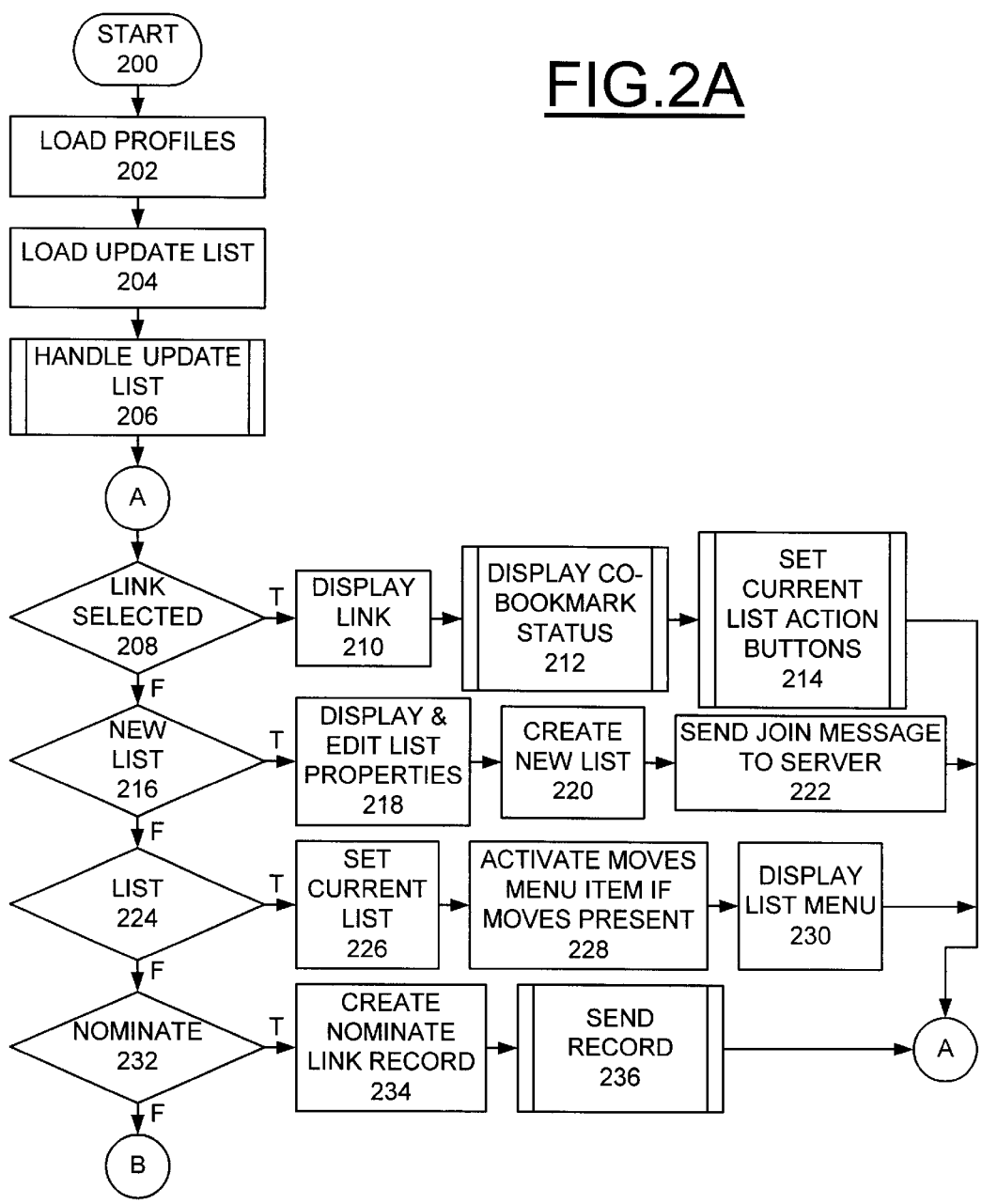

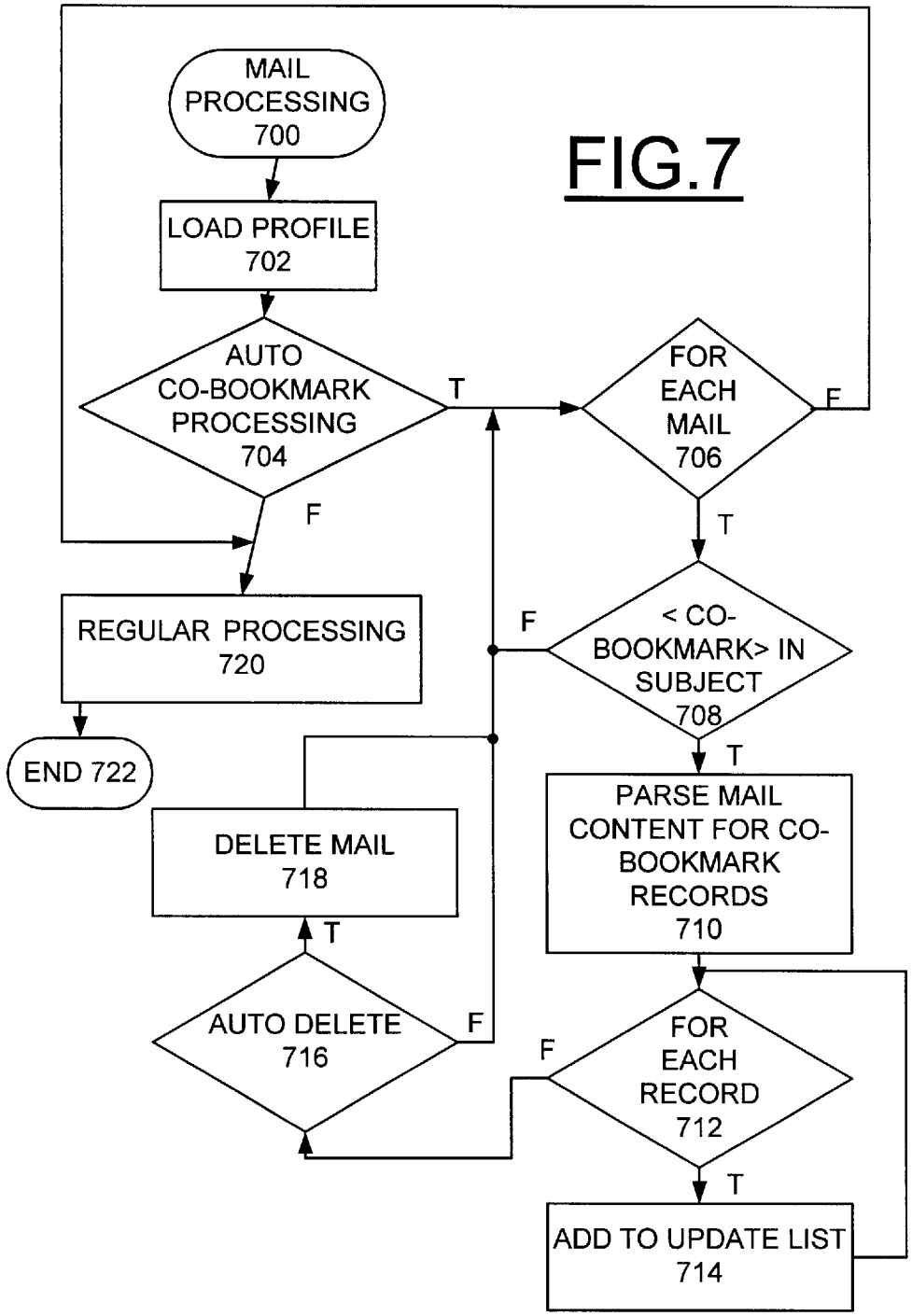

1200

| CO-BOOKMARK LIST A | | | | | | | ✕ |
|---|---|---|---|---|---|---|---|
| PROPERTIES | | | | | | | |
| STATUS | APPROVERS | OPINION | SUGGESTER | APPROVER 1 | FOLDER | LINK | |
| NOMINATED | 0 | +2 | JOHN | | TOPIC A | HTTP:\WWW.A.... | |
| APPROVED | 2 | +2.0 | MARY | JOHN | TOPIC B | HTTP:\WWW.B.... | |

| STATUS | OLD FOLDER | NEW FOLDER | LINK |
|---|---|---|---|
| MOVES LIST | | | |
| PROPOSED | TOPIC A | TOPIC C | HTTP:\WWW.A.... |
| MOVED | -- | TOPIC A | HTTP:\WWW.B.... |
| PROPOSED | TOPIC A | <DELETE> | HTTP:\WWW.Y.... |

FIG.14

METHOD AND COMPUTER PROGRAM PRODUCT FOR IMPLEMENTING COLLABORATIVE BOOKMARKS AND SYNCHRONIZED BOOKMARK LISTS

FIELD OF THE INVENTION

The present invention relates generally to the data processing field, and more particularly, relates to a method, apparatus and computer program product for implementing collaborative bookmarks and synchronized bookmark lists.

DESCRIPTION OF THE RELATED ART

Sharing information found on the web requires a URL to be passed to the other individual or individuals. This is not difficult, but it takes a little effort. The URL must be retyped into a note, or can be cut-and-pasted into a note, and sent. At the receiving end, the URL must be cut-and-pasted to the browser, or it may be a discovered as hot link. It is difficult to keep bookmark lists in synchronization when you have a browser at work and one at home. Lists of URLs can be maintained as web-pages, but they are cumbersome and require either an editor or a knowledge of hypertext markup language (HTML).

A need exists for a mechanism for implementing collaborative bookmarks and synchronized bookmark lists. It is desirable to provide such mechanism that is easy to use. It is desirable to provide such mechanism that enables an automatic update process.

SUMMARY OF THE INVENTION

A principal object of the present invention is to provide a method, apparatus and computer program product for implementing collaborative bookmarks and synchronized bookmark lists. Other important objects of the present invention are to provide such method, apparatus and computer program substantially without negative effect and that overcome many of the disadvantages of prior art arrangements.

In brief, a method, apparatus and computer program product are provided for implementing collaborative bookmarks and synchronized bookmark lists. A bookmark list is created. User selected changes are identified and the bookmark list is updated. A bookmark list is received by a user. The received bookmark list and changed elements of the bookmark list can be automatically stored.

In accordance with features of the invention, a server can be used to maintain the collaborative bookmarks and synchronized bookmark lists. Alternatively, embedded update records can be created in e-mail and bookmark lists are synchronized by sending e-mail messages to each participant. Proposed changes are distributed to the participants for the bookmarks list. Nominated changes and approved changes are identified. Opinions of the participants are recorded, tallied and displayed. The bookmark list can be updated responsive to group approval.

BRIEF DESCRIPTION OF THE DRAWINGS

The present invention together with the above and other objects and advantages may best be understood from the following detailed description of the preferred embodiments of the invention illustrated in the drawings, wherein:

FIGS. 2A, 2B, 3, 4, 5, 6A, 6B, and 7 are flow charts illustrating exemplary steps for implementing collaborative bookmarks and synchronized bookmark lists in accordance with the preferred embodiment;

FIGS. 10, 11, 12, 13 and 14 are exemplary display screens of the system of FIG. 1 illustrating user interfaces for providing user selections in accordance with the preferred embodiment;

DETAILED DESCRIPTION OF THE PREFERRED EMBODIMENTS

Figure 1A:
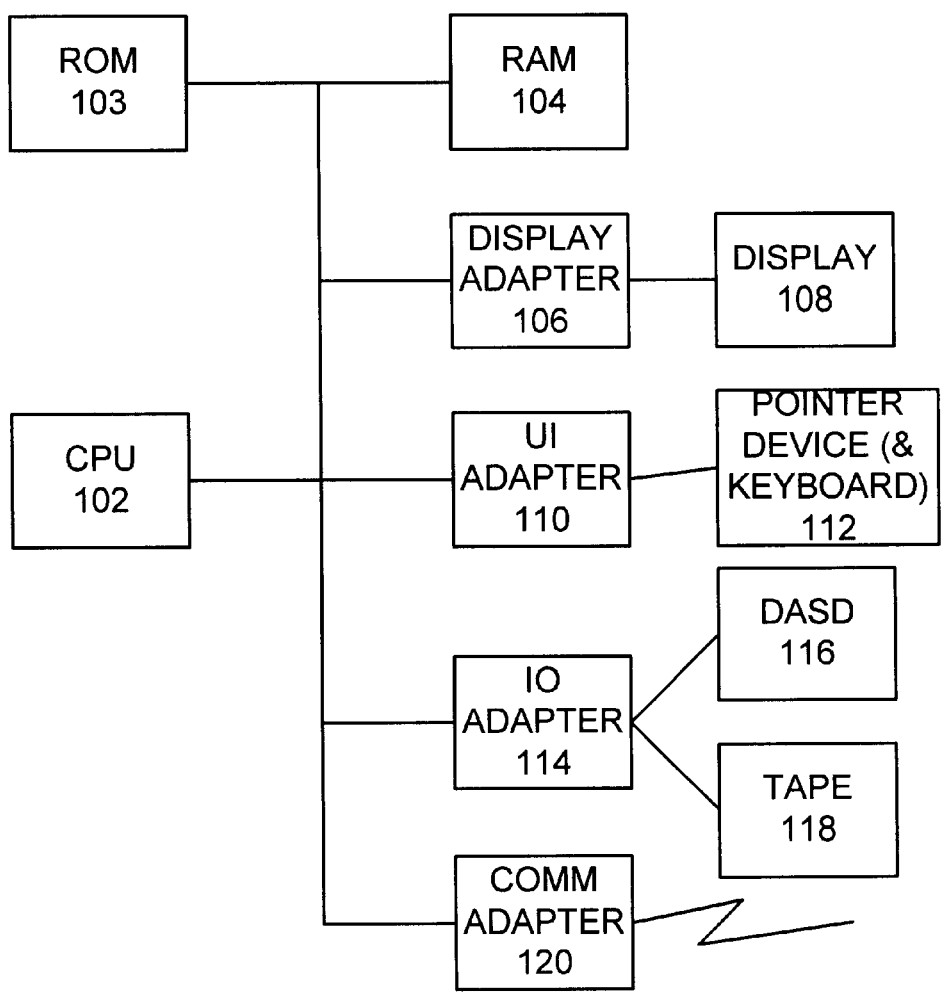
FIGS. 1A and 1B are block diagram representations illustrating a computer system and operating system for implementing a method and computer program product for implementing collaborative bookmarks and synchronized bookmark lists in accordance with the preferred embodiment.
Figure 1B:
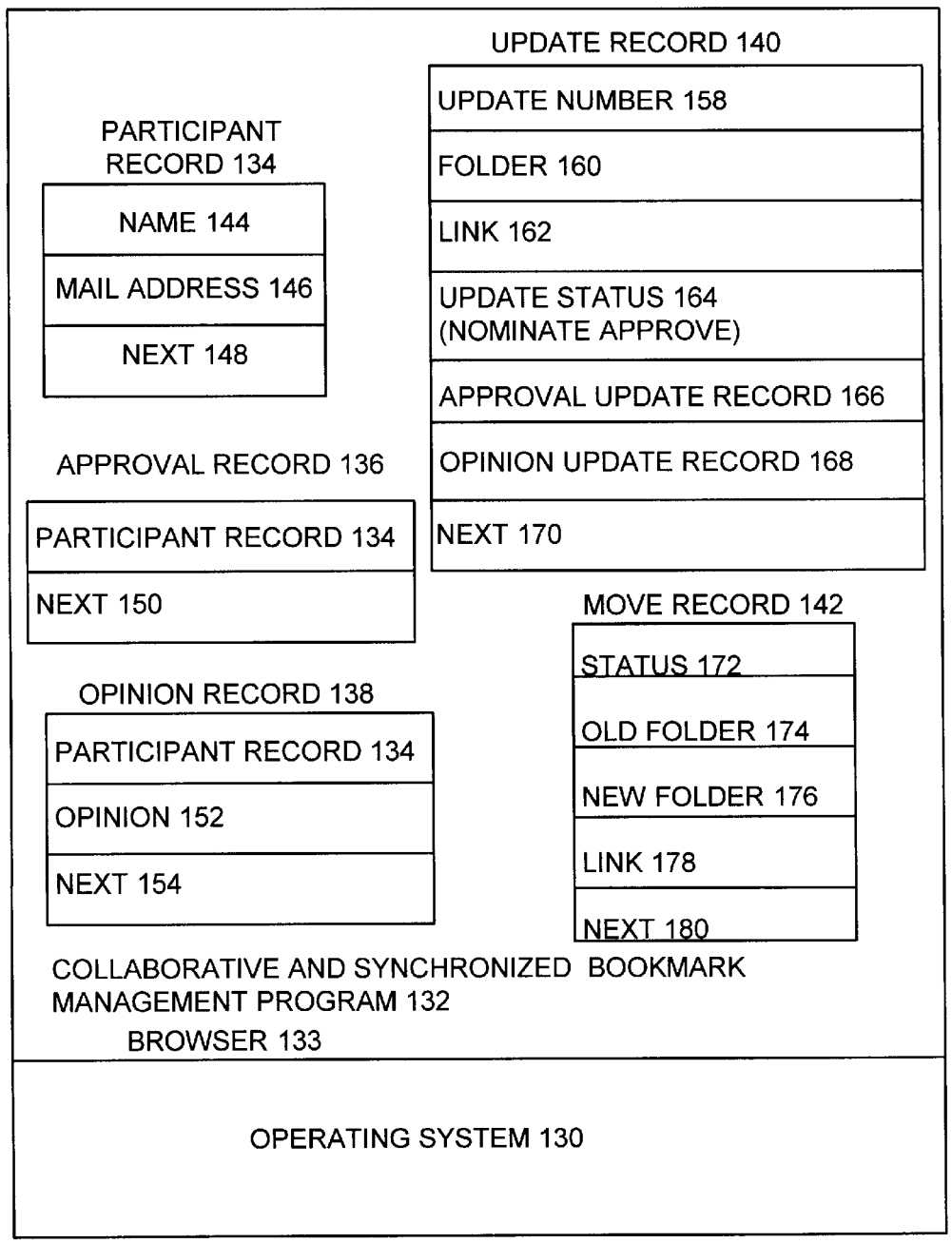
Figure 1C:
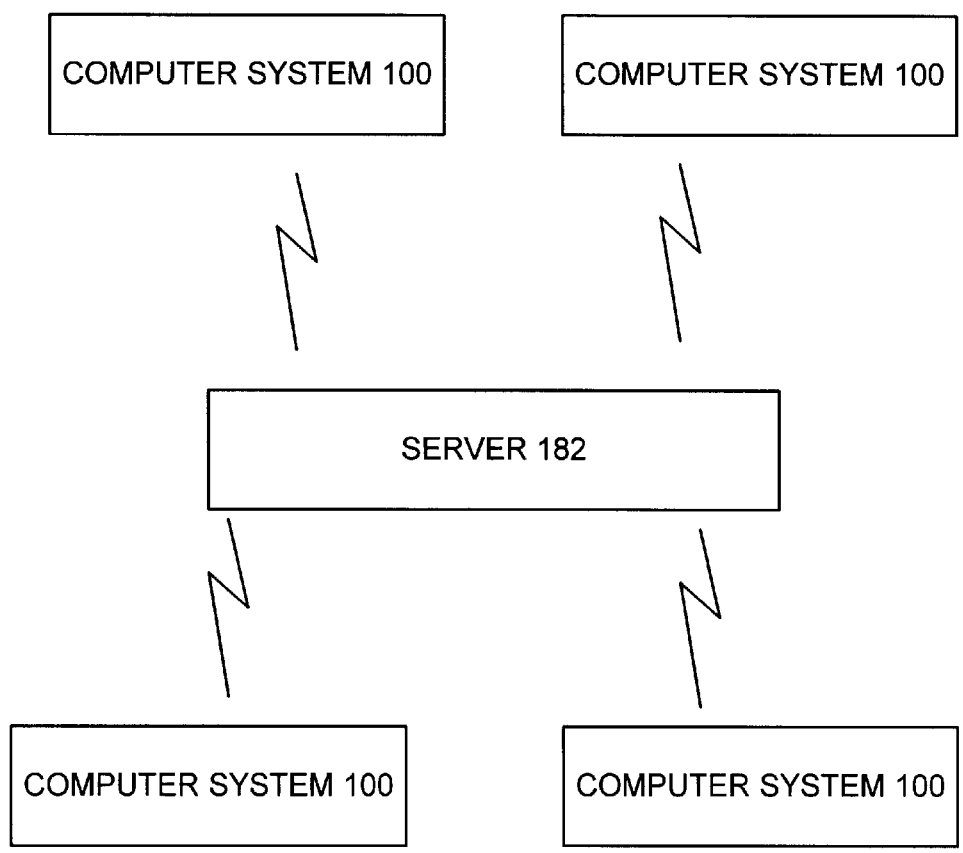
FIG. 1C is a block diagram representation illustrating an optional arrangement of multiple computer systems with a server in accordance with an alternative preferred embodiment.

Having reference now to the drawings, in FIGS. 1A, 1B and 1C, there is shown a computer or data processing system of the preferred embodiment generally designated by the reference character 100. As shown in FIG. 1, computer system 100 includes a central processor unit (CPU) 102, a read only memory 103, a random access memory 104, a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1A.

As shown in FIG. 1B, computer system 100 includes an operating system 130 and a collaborative and synchronized bookmark management program 132 of the preferred embodiment. Collaborative and synchronized bookmark management program 132 is used with a browser or similar program 133. In accordance with features of the invention, a participant record 134, an approval record 136, an opinion record 138, an update record 140, and a move record 142 are stored. Each participant record 134 includes a name 144, a mail address 146 and a next pointer 148. Each approval record 136 includes multiple participant records 134, each participant record stored together with a next pointer 150. Each opinion record 138 includes one or multiple participant records 134, each together with an opinion 152 and a next pointer 154. Update record 140 includes an update number 158, a folder 160, a link 162, an update status 164, such as nominate approve, an approval update record 166, an opinion update record 168 and a next pointer 170. Move record 142 includes a status 172, an old folder 174, a new folder 176, a link 178 and a next pointer 180.

As shown in FIG. 1C, multiple computer systems 100 can be used with an optional server 182. Server 182 optionally can be used to maintain collaborative bookmark lists for multiple users with computer systems 100. For example, when getting updates a client computer system 100 sends a last history record serial received, the server 182 then sends all history records that are newer to satisfy the request.

Various commercially available computers can be used for each computer system 100 and for optional server 182, for example, an IBM personal computer. CPU 102 is suitably programmed by the collaborative and synchronized bookmark management 132 to generate display screens, for example as shown in FIGS. 10, 11, 12, 13 and 14 to receive user selections and options, and to execute the flowcharts of FIGS. 2A, 2B, 3, 4, 5, 6A, 6B, 7 and 15.

Figure 8:
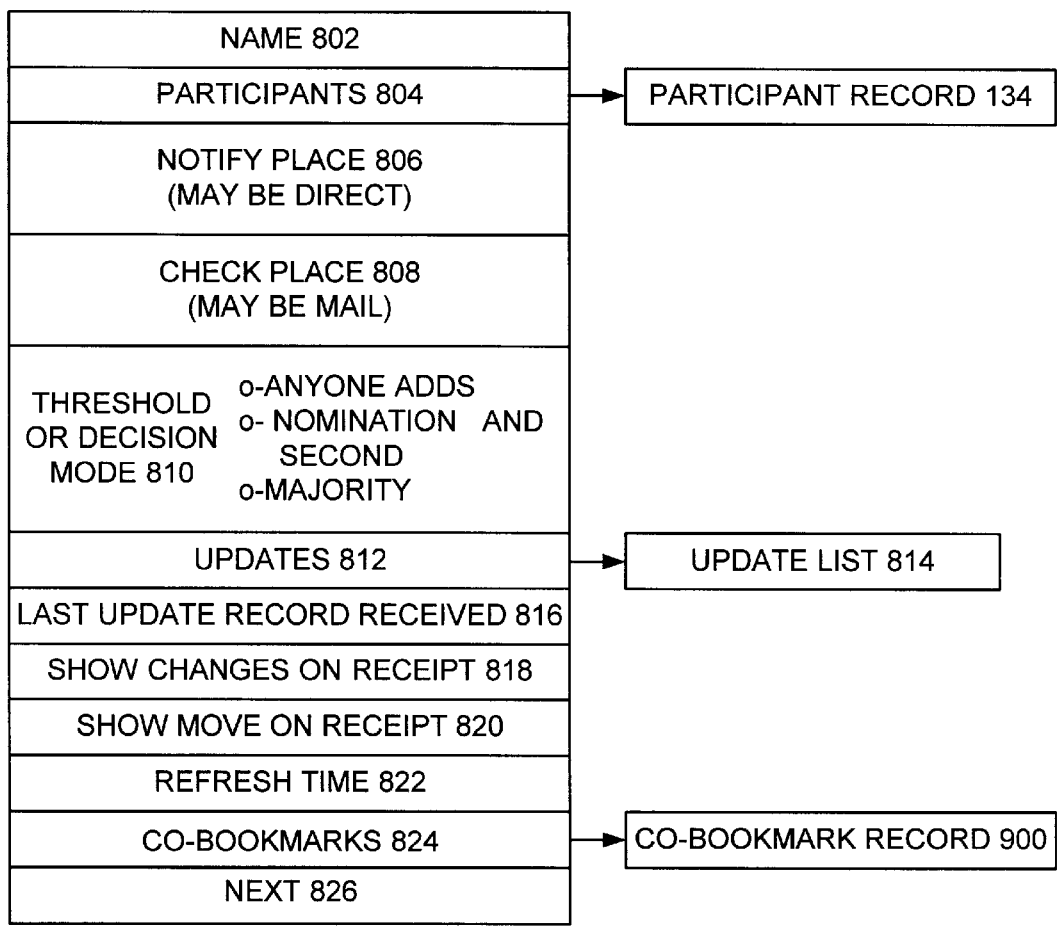
FIGS. 8 and 9 are diagrams respectively illustrating a co-bookmark list record and a co-bookmark record in accordance with the preferred embodiment.
Figure 9:
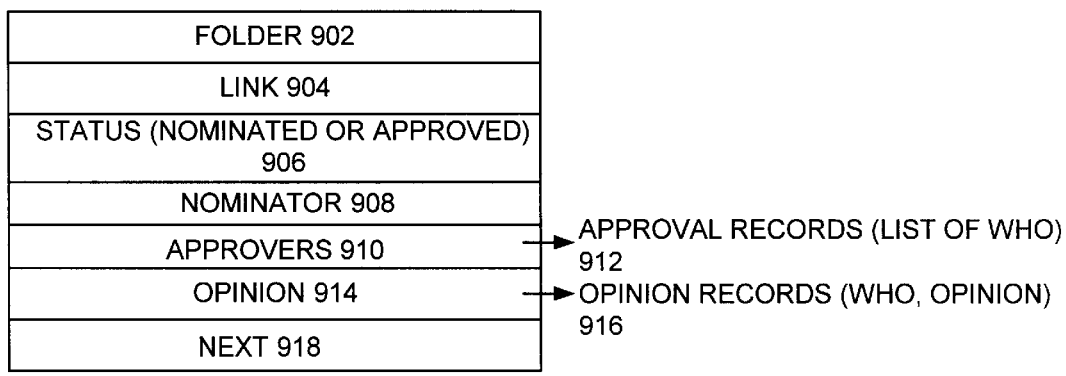

In accordance with features of the invention, collaborative and synchronized bookmark management program 132 of the preferred embodiment provides an enhanced capability to collect and utilize collaborative bookmark lists. Collaborative bookmark lists include multiple records or co-bookmarks. One or more users at multiple browser sites add bookmarks to a particular co-bookmark list. The resulting combined list becomes available to all other browser/users in the group. FIGS. 8 and 9 respectively illustrate a co-bookmark list record 800 and a co-bookmark record 900. The co-bookmark list record 800 and co-bookmark record 900 are used to enable an individual user to belong to more than one co-bookmark list group.

In accordance with features of the invention, sharing a uniform resource locator (URL) is as easy as adding a bookmark. A single keystroke and optional selection of Folder is all that is required. The bookmark is added to the group list, and the group list is updated at the various computer systems 100. Provisions are made for a central repository for the bookmark list. An ability to synchronize bookmark lists via e-mail messages is provided. Each set of N added bookmarks are collected and sent in an e-mail message to one or more remote collaboration sites where they are added to the bookmark list at that site. The list of group bookmarks can be kept as a separate list from private bookmarks. Sub-lists, list areas, or other designation can be used to distinguish between newly added bookmarks and permanent bookmarks in the list. Provisions are made for voting on bookmarks to delete, promote, and the like. In one embodiment, an addition to the list is temporary until at least one other member of the group views it and agrees it should be added. In another embodiment, additive bookmarks are temporary until a majority of users agree it should be added. Colors/symbols optionally indicate who added the bookmark to the list, and or who has approved the bookmark for addition to the list. Priorities can be given to certain users such that their additions to the list are given more weight. Provisions are made to list bookmarks by who added them, which received the most approvals, the age of the bookmarks, which bookmarks have the most collective viewing time within the collaborative and the like.

Collaborative and synchronized bookmark management program 132 of the preferred embodiment is an improvement over conventional ways that URL lists are kept on the web because the maintenance is natural and has the look and feel of bookmarks. It is easy to add new bookmarks. This is an improvement over simply copying the bookmark list because it is automatic, integrated, immediate, and handles updates simultaneously. This is an improvement over sending links or even entire lists to other people because in each case the list must be compiled, sent and uncompiled. Collaborative and synchronized bookmark management program 132 makes the process automatic. This is an improvement over any situation where you must go to a web page to view a list of URLs. The collaborative bookmark list is always and immediately available. Synchronization via e-mail allows bookmark lists to be shared without a local area network. This provides a solution for individual users who access the web from different places, for example from both work and home, or from two different computer systems 100 or even two operating systems 130.

Figure 2B:
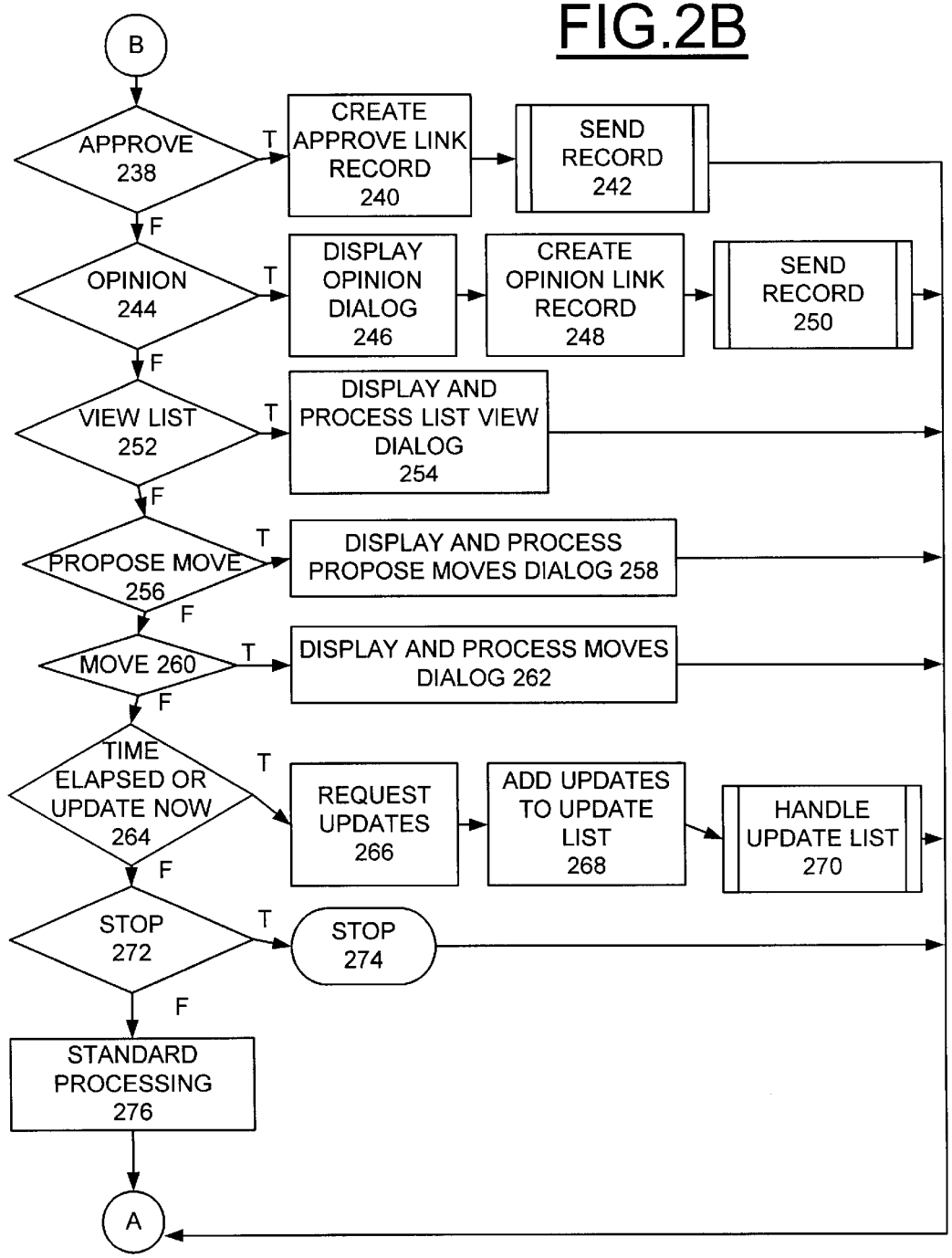
Figure 15:
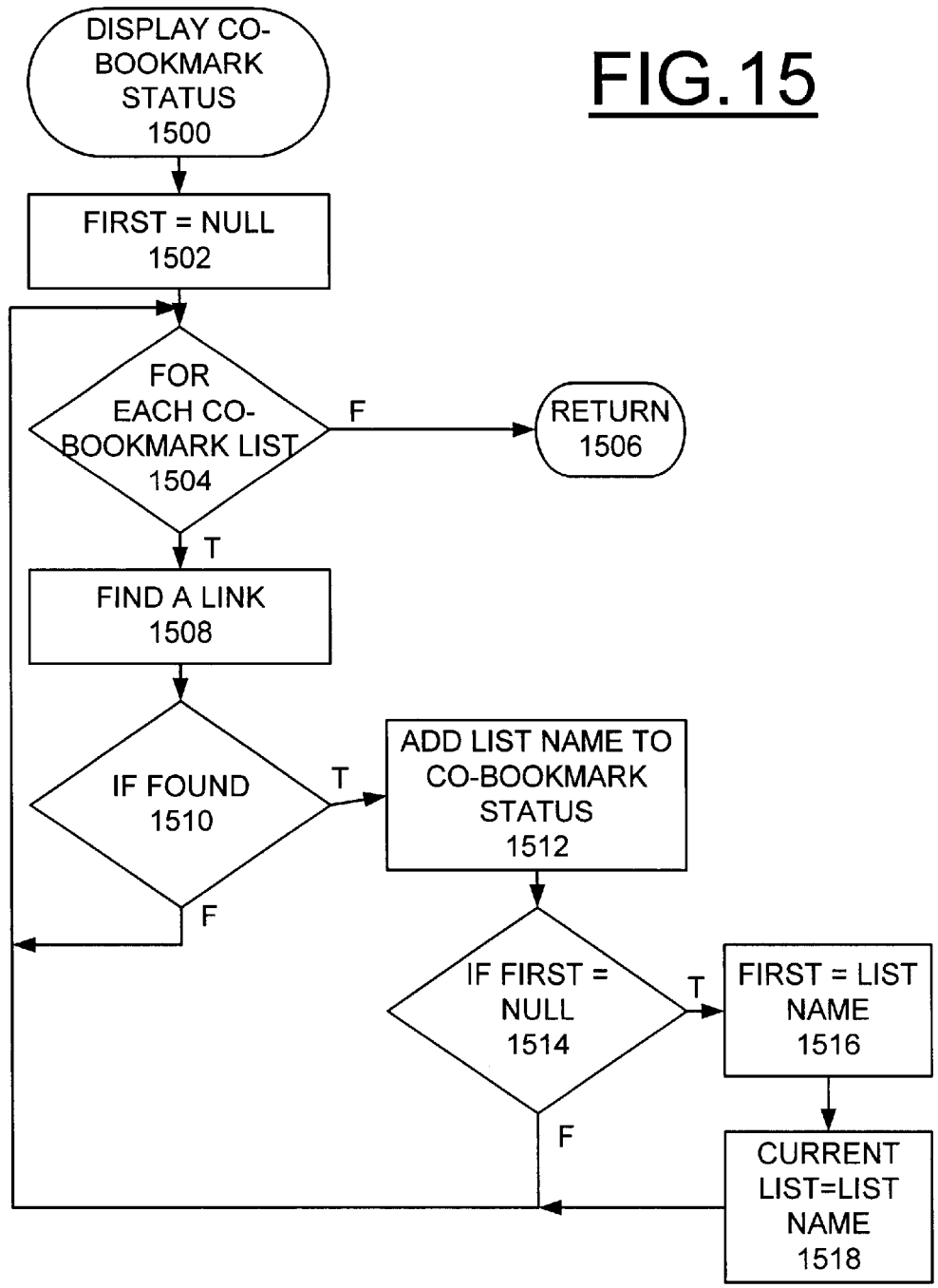
FIG. 15 is a flow chart illustrating exemplary steps for implementing collaborative bookmarks and synchronized bookmark lists to display co-bookmark status in accordance with the preferred embodiment.

Referring now to FIGS. 2A and 2B, exemplary overall steps for implementing collaborative bookmarks and synchronized bookmark lists in accordance with the preferred embodiment starting at a block 200. Profiles and an update list are loaded as indicated at blocks 202 and 204. Referring also to FIGS. 10, 11, 12, 13, and 14, exemplary user interfaces of the preferred embodiment are shown. A handle update list routine is performed as indicated at a block 206. The handle update list routine is illustrated and described with respect to FIG. 5. Checking for a link selected is performed as indicated at a decision block 208. With a link selected, the link is displayed as indicated at a block 210. A display co-bookmark status routine, illustrated and described with respect to FIG. 15, is performed as indicated at a block 212. Next a routine to set current list action buttons is performed as indicated at a block 214. The routine to set current list action buttons is illustrated and described with respect to FIG. 4. An exemplary current list action button of nominate is shown in an illustrated user interface 1000 of FIG. 10. Other list action buttons include approve and opinion. Then the sequential operations return to entry point A to check for the link selected at decision block 208.

When link selected is not identified at decision block 208, checking for a new list is performed as indicated at a decision block 216. When a new list is identified, the list properties are displayed and edited as indicated at a block 218. An exemplary co-bookmark list A shown in an illustrated user interface 1200 of FIG. 12 illustrates exemplary list properties. A new list is created as indicated at a block 220. As indicated at a block 222, a join message is sent to a central server 182 that maintains the collaborative bookmark lists. Then the sequential operations return to entry point A to continue the sequential operations.

Figure 10:
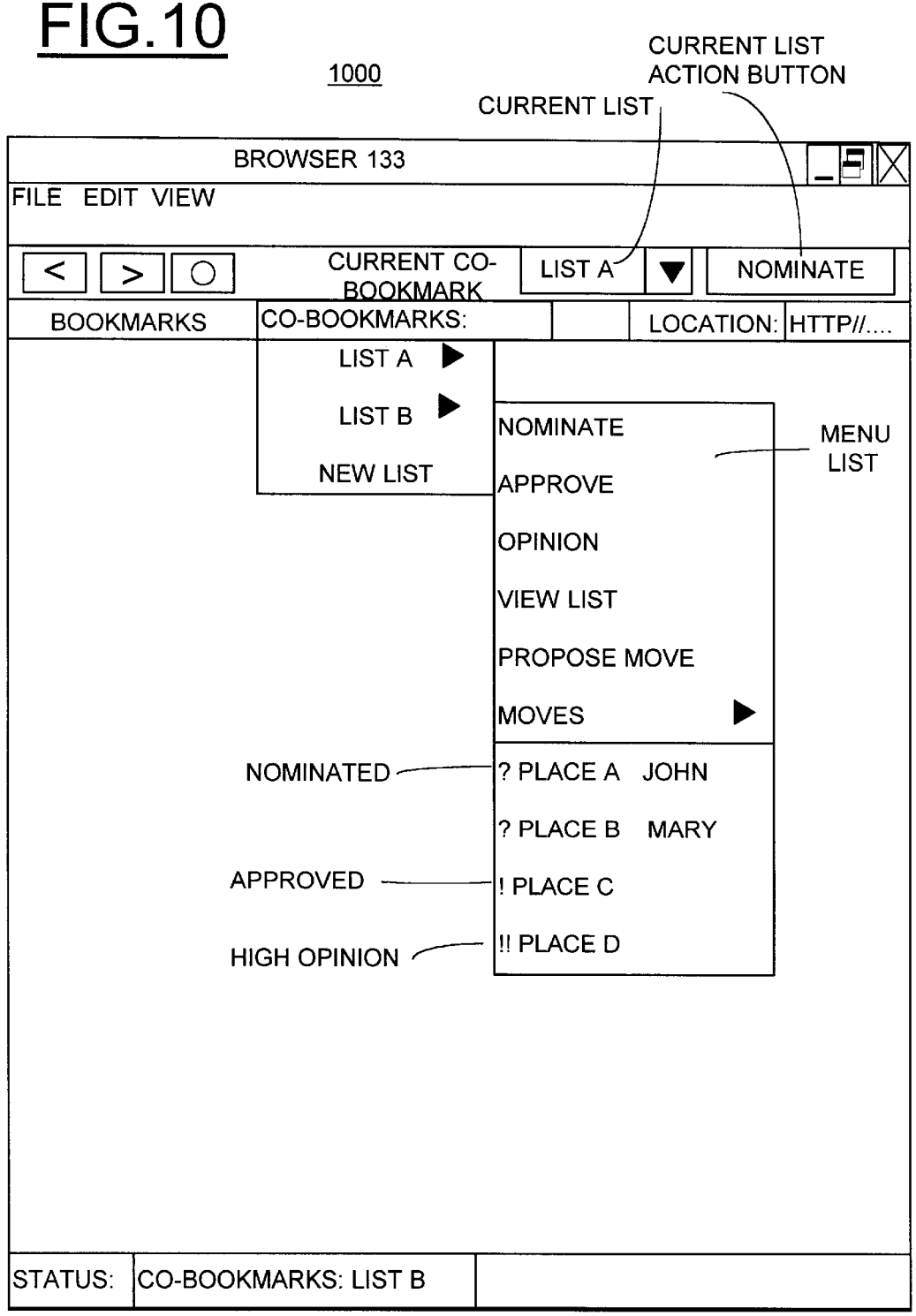

When a new list is not identified, checking for a list is performed as indicated at a decision block 224. When a list is identified, then the current list is set as indicated at a block 226. For example, a current list A is shown in FIG. 10. Then a moves menu item is activated, if moves selection is present as indicated at a block 228. The list menu is displayed as indicated at a block 230 and as further described in the next paragraph. Then the sequential operations return to entry point A to continue the sequential operations.

Figure 11:
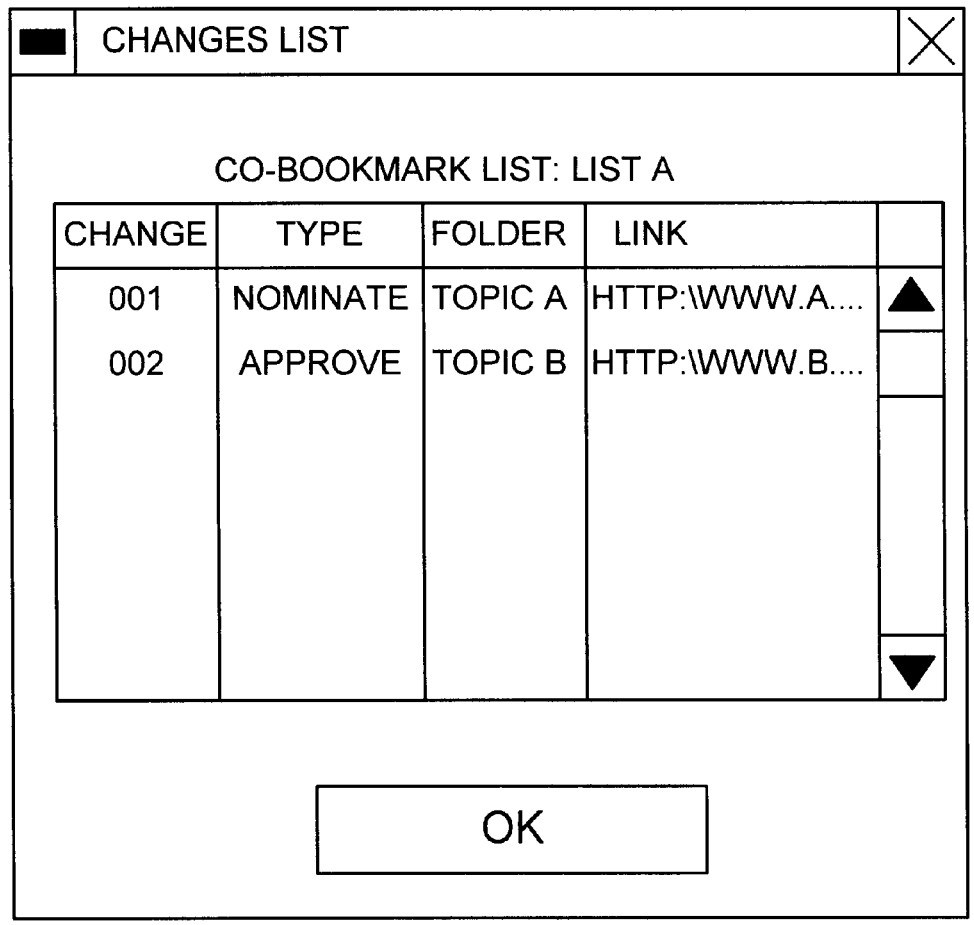

In FIG. 10, user interface 1000 illustrates a menu list for receiving user selections including nominate, approve, opinion, view list, propose move, moves and co-bookmarks for a selected one of list A, list B or new list. The co-bookmarks are listed, optionally with a symbol indicating their status as nominated or approved, with nominated links having nominator's names shown, and with approved links having participant opinions tallied and the value of opinions being displayed as symbols next to the link. FIG. 11 illustrates an exemplary changes list user interface 1100. FIG. 12 illustrates an exemplary user interface 1200 including the properties of the co-bookmark list. The co-bookmark list properties include status, approvers, opinion, suggester, approver 1, folder and link.

When a list is not identified, checking for a nominate selection is performed as indicated at a decision block 232. When nominate is identified, then a nominate link record is created as indicated at a block 234. A send record routine is performed as indicated at a block 236. The send record routine is illustrated and described with respect to FIG. 3. Then the sequential operations return to entry point A to continue the sequential operations.

Figure 3:
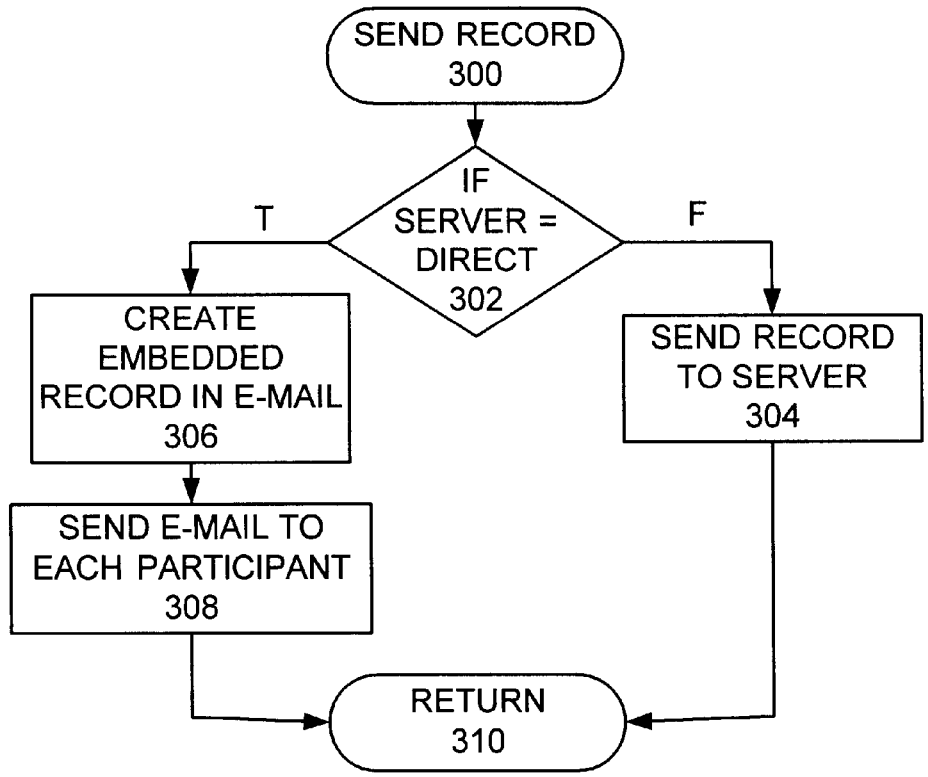

Referring to FIG. 2B, checking for an approve selection is performed as indicated at a decision block 238. When approve is identified, then a approve link record is created as indicated at a block 240. Then the send record routine illustrated in FIG. 3 is performed as indicated at a block 242. Then the sequential operations return to entry point A in FIG. 2A to continue the sequential operations.

When approve is not identified, then checking for an opinion selection is performed as indicated at a decision block 244. When opinion is identified, then is an opinion dialog is displayed as indicated at a block 246. An opinion link record is created as indicated at a block 248 and the record is sent as indicated at a block 250. Then the sequential operations return to entry point A in FIG. 2A to continue the sequential operations.

Figure 13:
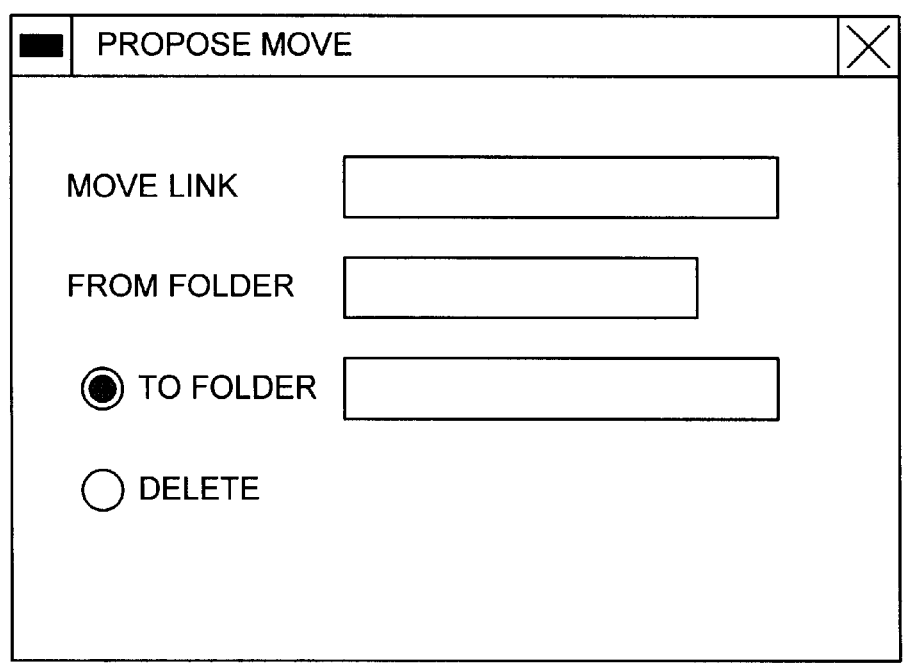

Otherwise when opinion is not identified, then checking for a view list selection is performed as indicated at a decision block 252. When view list is identified, then the list view dialog is displayed and processed as indicated at a block 254. FIG. 12 illustrates the co-bookmark list user interface 1200. Then the sequential operations return to entry point A in FIG. 2A. When view list is not found, checking for a propose move selection is performed as indicated at a decision block 256. When propose move is identified, then the propose moves dialog is displayed, and processed as indicated at a block 258. FIG. 13 illustrates an exemplary propose move user interface 1300. Then the sequential operations return to entry point A in FIG. 2A.

When propose move is not found, checking for a move selection is performed as indicated at a decision block 260. When move is identified, then the moves dialog is displayed and processed as indicated at a block 262. FIG. 14 illustrates an exemplary moves list user interface 1400. Then the sequential operations return to entry point A in FIG. 2A. A time elapsed or update now entry is identified as indicated at a decision block 264. When an update time is identified at block 264, then updates are requested as indicated at a block 266. Updates are added to the update list as indicated at a block 268. A handle update list routine is performed as indicated at a block 270. The handle update list routine is illustrated and described with respect to FIG. 5. Then the sequential operations return to entry point A in FIG. 2A. When an update time is not identified at block 264, then checking for a stop entry is performed as indicated at a decision block 272. If found, then the stop is performed as indicated at a block 274. Then the sequential operations return to entry point A in FIG. 2A. Otherwise, if stop is not found, then standard processing is performed as indicated at a block 276.

Referring now to FIG. 3, sequential operations of the send record routine are shown starting at a block 300. This send record routine is performed to send the nominate link record created at block 234 in FIG. 2A, the approve link record created at block 240 in FIG. 2B, and the opinion link record created at block 248 in FIG. 2B. Checking a server setting is performed as indicated at a decision block 302. When the server 182 is used, then the record is sent to the server as indicated at a block 304. When the server 182 is set to direct as indicated in FIG. 8 by check place 806 in the co-bookmark record 800, then an embedded record in e-mail is created as indicated at a block 306. The e-mail is sent to each participant as indicated at a block 308. Then the sequential operations return as indicated at a block 310.

Figure 4:
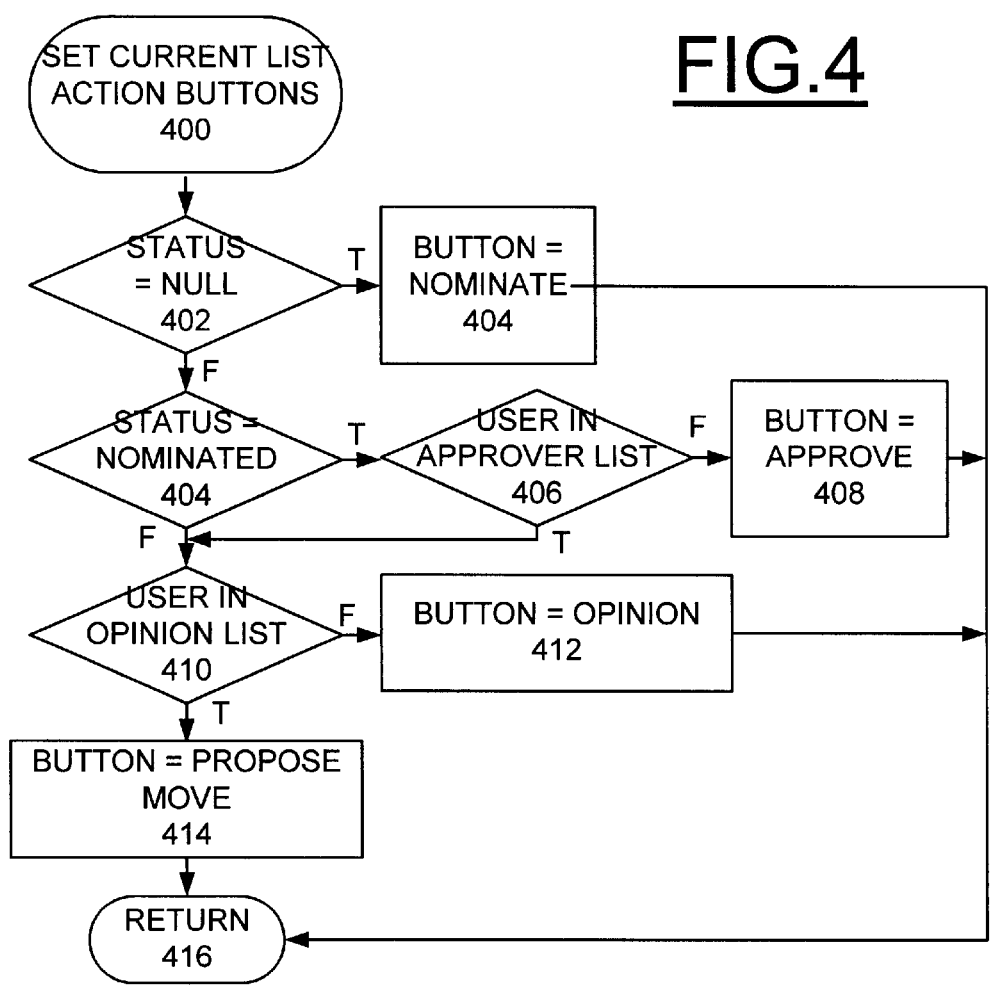

Referring now to FIG. 4, sequential operations of the set current list action buttons routine are shown starting at a block 400. If the status of null is identified at a decision block 402, then the current list action button is set to nominate as indicated at a block 404. In the user interface 1000 of FIG. 10, the current list action button of nominate is shown. Otherwise, when the status of null is not identified at decision block 402, checking the status of the current list action button of nominated is performed as indicated at a decision block 404. If found, then checking whether the user is in the approver list is performed as indicated at a decision block 406. When the user is not in the approver list, then the current list action button is set to approve as indicated at a block 408. Otherwise, checking whether the user is in the opinion list is performed as indicated at a decision block 410. When the user is not in the approver list, then the current list action button is set to opinion as indicated at a block 412. Otherwise, the current list action button is set to propose move as indicated at a block 414. Then the sequential operations return as indicated at a block 416.

Figure 5:
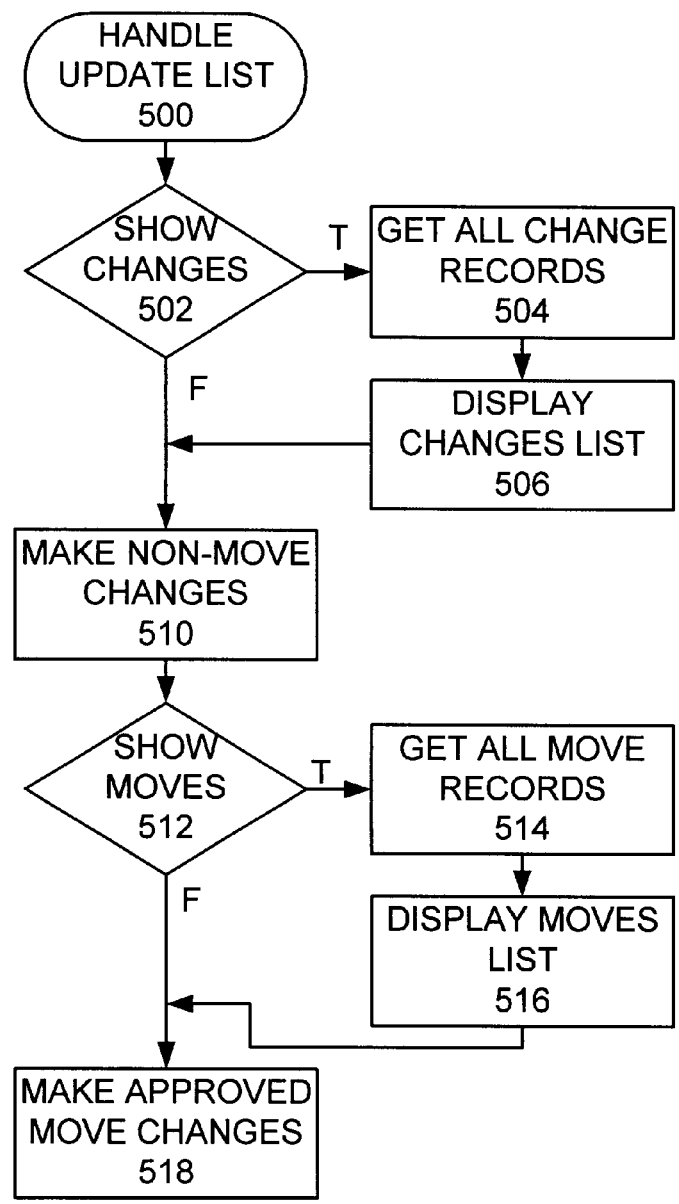

Referring now to FIG. 5, sequential operations of the handle update list routine are shown starting at a block 500. Checking for a show changes selection is performed as indicated at a decision block 502. If found, then all change records are obtained and the changes list is displayed as indicated at blocks 504 and 506. The changes list user interface 1100 is illustrated in FIG. 11. Otherwise, when show changes is not selected, then non-move changes are made without interaction as indicated at a block 512. Checking for show move changes is performed as indicated at a decision block 512. If show move changes is selected, then all move records are obtained and the moves list is displayed as indicated at blocks 514 and 516. Otherwise, when show moves is not selected, then approved move changes are made as indicated at a block 518. For example, with an individual user maintaining synchronized bookmark lists with a browser at work and one at home, approved move and non-move changes made can be made at blocks 510 and 518 without viewing the records sent via the send routine of FIG. 3.

Figure 6A:
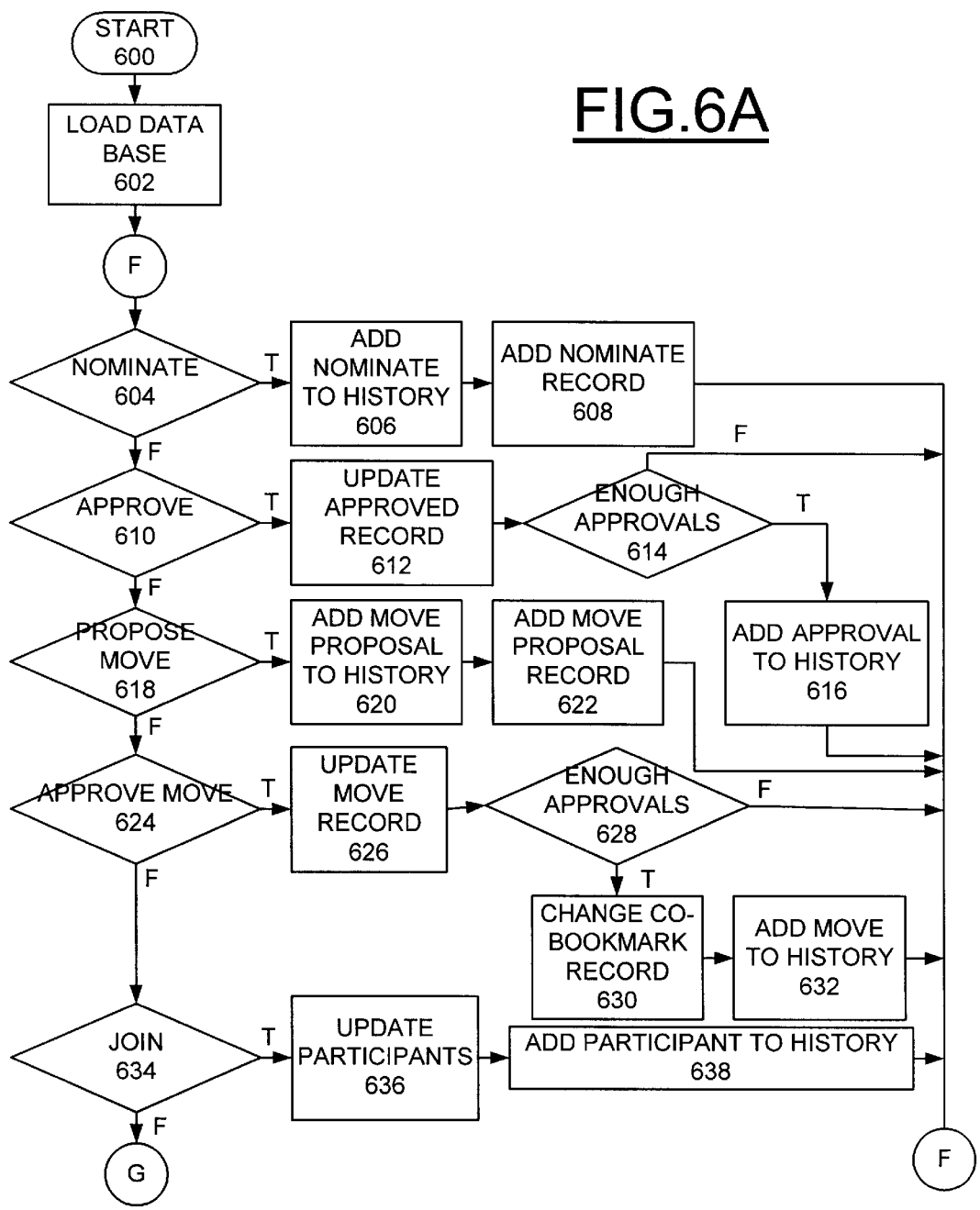
Figure 6B:
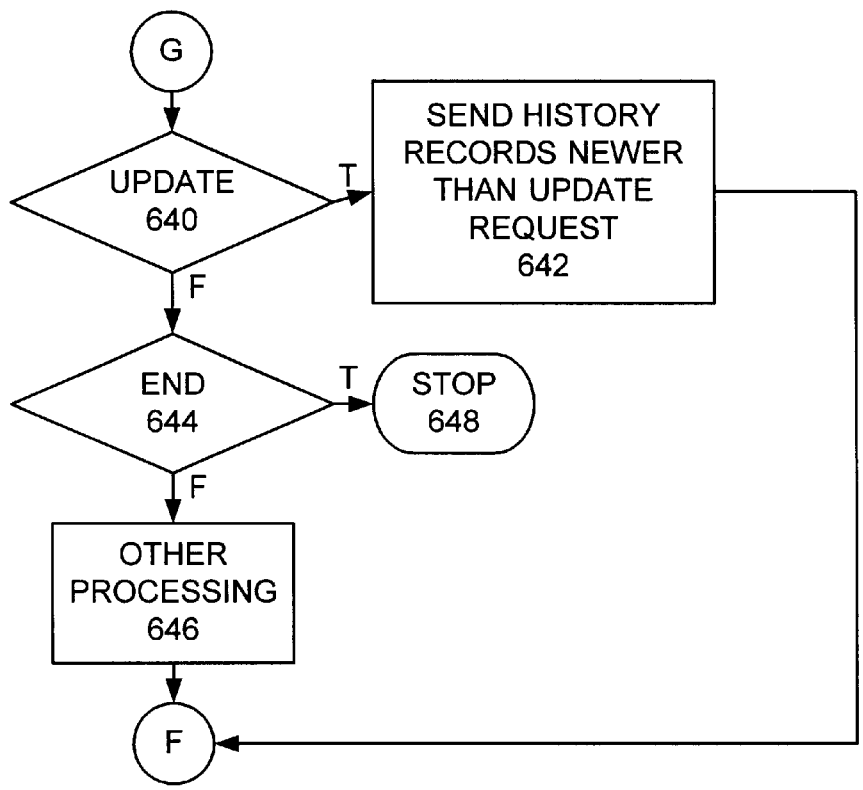

Referring now to FIGS. 6A and 6B, there are shown sequential operations of the server 182 for implementing collaborative bookmarks and synchronized bookmark lists in accordance with the preferred embodiment starting at a block 600. A historical data base is loaded to initialize and start these sequential operations as indicated at a block 602. Checking for a nominate record is performed as indicated at a decision block 604. If a nominate record is found, the nominate is added to the history and the nominated record is added as indicated at blocks 606 and 608. Then the sequential operations return to entry point F in FIG. 6A to continue with checking for a nominate selection at block 604. Otherwise checking for an approve record is performed as indicated at a decision block 610. If an approve record is found, the approved record is updated as indicated at a block 612. Checking for enough approvals is performed as indicated at a decision block 614. If enough approvals are found, then the approval is added to the history as indicated at a block 616. If enough approvals are not found or after the approval is added, then the sequential operations return to entry point F in FIG. 6A. If an approve record is not found, checking for a propose move record is performed as indicated at a decision block 618. If a propose move record is found, then the move proposal is added to the history as indicated at a block 620 and is added to the move proposal record as indicated at a block 622. Then the sequential operations return to entry point F in FIG. 6A. When a propose move record is not found, then checking for an approve move record is performed as indicated at a decision block 625. If an approve move record is found, then the approve proposal is added to the history as indicated at a block 626. Checking for enough approvals is performed as indicated at a decision block 628. If enough approvals are found, then the co-bookmark record is changed as indicated at a block 630 and the move is added to history as indicated at a block 632. If enough approvals are not found or after the move is added to history, then the sequential operations return to entry point F in FIG. 6A. If an approve move record is not found, then checking for a join request is performed as indicated at a decision block 634. When a join request is found, the participants for the co-bookmark list record 800 is updated with the new participant as indicated at a block 636. The participant is added to history as indicated at a block 638. Otherwise, if a join request is not found, the sequential operations continue following entry point G in FIG. 6B.

Referring to FIG. 6B, checking for an update request is performed as indicated at a decision block 640. When an update request is found, the history records newer than each update requests are sent as indicated at a block 642. Then the sequential operations return to entry point F in FIG. 6A. When an update request is not found, checking for an end selection is performed as indicated at a decision block 644. Unless an end selection is found, other processing continues as indicated at a block 646. Then the sequential operations return to entry point F in FIG. 6A. If true, the operations stop as indicated at a block 648.

Referring now to FIG. 7, sequential operations of a mail processing routine are shown starting at a block 700. First a profile is loaded as indicated at a block 702. Checking for automatic co-bookmark processing is performed as indicated at a decision block 704. If true, for each mail identified at block 706, checking for <co-bookmark> in the subject is provided as indicated at a decision block 708. For each mail with <co-bookmark> in the subject, the mail content is parsed for co-bookmark records as indicated at a block 710 and each record is added to the update list as indicated at blocks 712 and 714. Checking for an auto delete setting is performed as indicated at a decision block 716. With auto delete selected, then the mail is deleted as indicated at a block 718. Otherwise when automatic co-bookmark processing is not selected, regular processing is performed as indicated at a block 720. The sequential operations end as indicated at a block 722.

FIGS. 8 and 9 respectively illustrate the stored co-bookmark list record 800 and the co-bookmark record 900 in accordance with the preferred embodiment. The co-bookmark list record 800 includes a name 802, participants 804 pointing to a plurality of participant records 134, a notify place 806 which may be direct and a check place 808 which may be mail. The co-bookmark list record 800 includes a threshold or decision mode 810, where anyone adds, anyone nominates and a second is required, or a majority vote is required to implement changes. The co-bookmark list record 800 includes updates 812 pointing to an update list 814, a last update record received 816, a show changes on receipt 818, a show move on receipt 820, a refresh time 822. The co-bookmark list record 800 includes co-bookmarks 824 pointing to co-bookmark record 900 and a next pointer 826.

Referring to FIG. 9, the co-bookmark record 900 includes multiple fields for storing a folder 902, a link 904, a status 906, such as nominated or approved, a nominator 908. Co-bookmark record 900 includes approvers 910 pointing to approval records 912, an opinion 914 pointing to opinion records 916 and a next pointer 916.

Referring now to FIG. 15, sequential operations of the display co-bookmark status routine are shown starting at a block 1500. First is set to null as indicated at a block 1502. For each co-bookmark list, a link is found as indicated at a blocks 1504 and 1508. For each link found, the list named is added to the co-bookmark status as indicated at block 1510 and 1512. Then checking if first is null is performed as indicated at a decision block 1514. If true, the first is set to the list name as indicated at a block 1518 and the current list is set to the list name as indicated at a block 1518.

Figure 16:
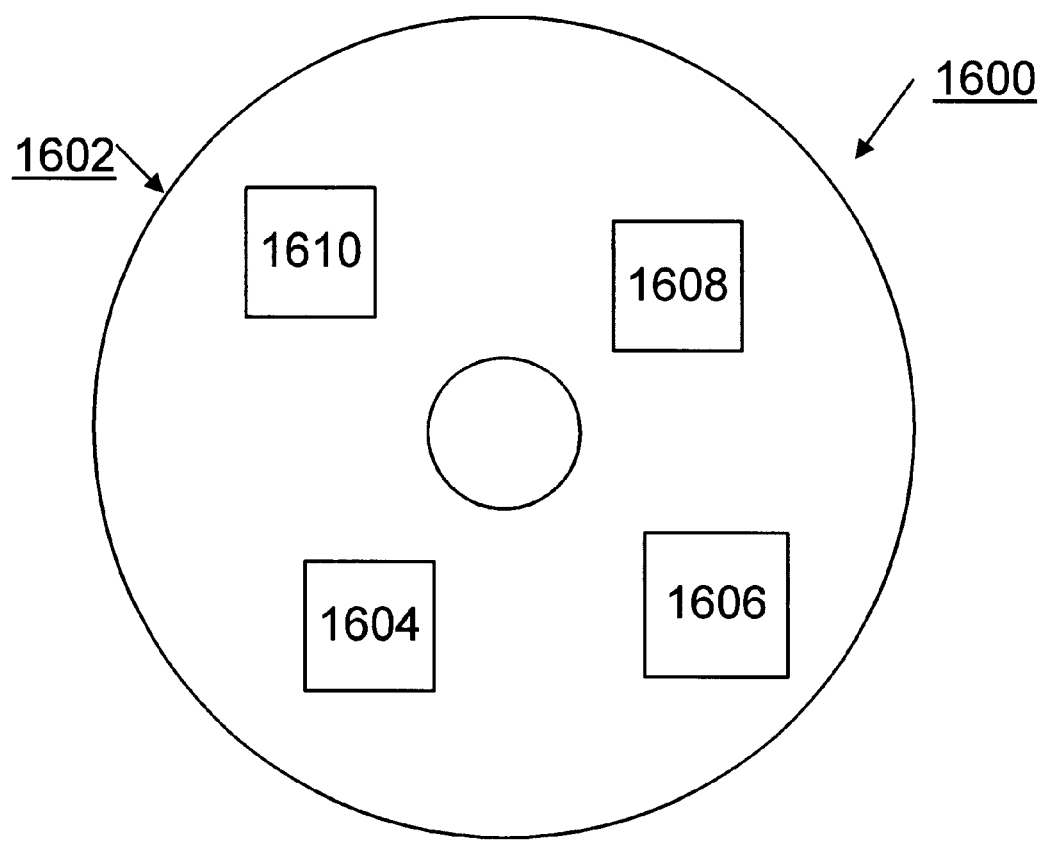
FIG. 16 is a block diagram illustrating a computer program product in accordance with the preferred embodiment.

Referring to FIG. 16, an article of manufacture or a computer program product 1600 of the invention is illustrated. The computer program product 1600 includes a recording medium 1602, such as, a floppy disk, a high capacity read only memory in the form of an optically read compact disk or CD-ROM, a tape, a transmission type media such as a digital or analog communications link, or a similar computer program product. Recording medium 1602 stores program means 1604, 1606, 1608, 1610 on the medium 1602 for carrying out the methods for implementing collaborative bookmarks of the preferred embodiment in the system 100 of FIGS. 1A, 1B, and 1C.

A sequence of program instructions or a logical assembly of one or more interrelated modules defined by the recorded program means 1604, 1606, 1608, 1610, direct the computer system 100 for implementing collaborative bookmarks of the preferred embodiment.

While the present invention has been described with reference to the details of the embodiments of the invention shown in the drawing, these details are not intended to limit the scope of the invention as claimed in the appended claims.

What is claimed is:

1. A computer-implemented method for implementing collaborative bookmarks comprising the steps of:

receiving a bookmark list; said bookmark list including a co-bookmark list record including a plurality of participants for said bookmark list; at least one bookmark list element; update notify options and update threshold options;

storing said received bookmark list including said co-bookmark list; and updating said stored bookmark list for each of said plurality of participants utilizing said co-bookmark list record including creating an embedded co-bookmark list record element in e-mail and sending said e-mail to each said participant for said bookmark list.

2. A computer-implemented method for implementing collaborative bookmarks as recited in claim 1 wherein the step of updating said bookmark list utilizing said co-bookmark list record includes the step of receiving a change bookmark list element of said bookmark list; and adding said change bookmark list element to said stored bookmark list.

3. A computer-implemented method for implementing collaborative bookmarks as recited in claim 2 includes the steps of creating said change bookmark list element of said bookmark list utilizing a separate computer system and sending said created change bookmark list element of said bookmark list to each said participant for said bookmark list.

4. A computer-implemented method for implementing collaborative bookmarks as recited in claim 1 includes the step of creating said bookmark list utilizing a separate computer system.

5. A computer-implemented method for implementing collaborative bookmarks as recited in claim 4 includes the steps of sending said created bookmark list to each participant for said bookmark list.

6. A computer-implemented method for implementing collaborative bookmarks as recited in claim 3 includes the steps of parsing said e-mail for said embedded co-bookmark list record element; and adding said co-bookmark list record element to an update list.

7. A computer-implemented method for implementing collaborative bookmarks comprising the steps of:
   creating a bookmark list; said book mark list including a co-bookmark list record including a plurality of participants for said bookmark list; at least one bookmark list element; update notify options and update threshold options;
   identifying user selected changes for said bookmark list; and
   updating said bookmark list for each of said plurality of participants responsive to said identified user selected changes for said bookmark list utilizing said co-bookmark list record including creating an embedded co-bookmark record element in e-mail and sending said e-mail to each said participant for said bookmark list.

8. A computer-implemented method for implementing collaborative bookmarks as recited in claim 7 wherein the step of creating a bookmark list includes the steps of displaying and editing list properties responsive to user selections; and storing said user selections in said co-bookmark list record.

9. A computer-implemented method for implementing collaborative bookmarks as recited in claim 8 wherein the step of displaying and editing list properties responsive to user selections includes the steps of identifying and displaying a status of nominated or approved, a folder and a link for a change bookmark list element.

10. A computer-implemented method for implementing collaborative bookmarks as recited in claim 9 includes the steps of identifying and displaying a nominator, an opinion vote, and an approver.

11. A computer-implemented method for implementing collaborative bookmarks as recited in claim 7 wherein the step of identifying user selected changes includes the steps of receiving a nominate selection, creating a nominate link record, and sending said created nominate link record to each participant for said bookmark list.

12. A computer-implemented method for implementing collaborative bookmarks as recited in claim 11 includes the steps of sending said created nominate link record to a server.

13. A computer-implemented method for implementing collaborative bookmarks as recited in claim 7 wherein the step of updating said bookmark list for each of said plurality of participants utilizing said co-bookmark list record includes the steps of parsing said e-mail for said embedded co-bookmark list record element; and adding said co-bookmark record element to an update list.

14. A computer-implemented method for implementing collaborative bookmarks as recited in claim 7 wherein the step of identifying user selected changes includes the steps of receiving an approval selection, creating an approval link record.

15. A computer-implemented method for implementing collaborative bookmarks as recited in claim 7 wherein the step of identifying user selected changes includes the steps of receiving an opinion selection, creating an opinion link record.

16. A computer-implemented method for implementing collaborative bookmarks as recited in claim 7 wherein the step of updating said bookmark list for each of said plurality of participants utilizing said co-bookmark list record includes the steps of identifying an elapsed time or an update time, adding updates to an update list and performing a handle update list routine.

17. A computer-implemented method for implementing collaborative bookmarks as recited in claim 16 wherein the step of performing said handle update list routine includes the steps of identifying a show changes user selection and obtaining all change records and displaying a change list.

18. A computer-implemented method for implementing collaborative bookmarks as recited in claim 17 includes the steps of identifying a show moves user selection and obtaining all move records and displaying a moves list.

19. Apparatus for implementing collaborative bookmarks and synchronized bookmarks comprising:
   a stored collaborative bookmark list record, said stored collaborative bookmark list record including a plurality of participants, at least one bookmark record; update notify options; update threshold options, and a refresh time, and
   a collaborative bookmark and synchronized bookmark management program receiving user selected updates; and utilizing said stored collaborative bookmark list record for maintaining a bookmark list for each of said plurality of participants including creating an embedded co-bookmark list record element in e-mail and sending said e-mail to each said participant for said bookmark list.

20. Apparatus for implementing collaborative bookmarks and synchronized bookmarks as recited in claim 19 wherein said stored collaborative bookmark list record includes said received user selected updates.

21. Apparatus for implementing collaborative bookmarks and synchronized bookmarks as recited in claim 19 wherein said bookmark record of said stored collaborative bookmark list record includes a status indication, said status indication including nominated and approved.

22. Apparatus for implementing collaborative bookmarks and synchronized bookmarks as recited in claim 19 includes a stored participant record and approval record.

23. Apparatus for implementing collaborative bookmarks and synchronized bookmarks as recited in claim 19 includes a stored participant record and opinion record.

24. A computer program product for implementing collaborative bookmarks and synchronized bookmarks comprising:
   a collaborative and synchronized bookmark management program;
   said collaborative and synchronized bookmark management program storing a bookmark list; said bookmark list including a co-bookmark list record including a plurality of participants for said bookmark list; at least one bookmark list element; and update threshold options;
   said collaborative and synchronized bookmark management program receiving user selections; and
   said collaborative and synchronized bookmark management program updating said bookmark list for each of said plurality of participants responsive to said received user selections utilizing said co-bookmark list record including creating an embedded co-bookmark list record element in e-mail and sending said e-mail to each said participant for said bookmark list.

25. A computer program product for implementing collaborative bookmarks and synchronized bookmarks as recited in claim 24 wherein said collaborative and synchronized bookmark management program updating said bookmark list includes sending updated records to each said participant for said bookmark list.

26. A computer program product for implementing collaborative bookmarks and synchronized bookmarks as recited in claim 24 wherein said collaborative and synchronized bookmark management program receiving user selections includes receiving user nominate selections.

27. A computer program product for implementing collaborative bookmarks and synchronized bookmarks as recited in claim 24 wherein said collaborative and synchronized bookmark management program receiving user selections includes receiving user opinion selections.

28. A computer program product for implementing collaborative bookmarks and synchronized bookmarks as recited in claim 24 wherein said collaborative and synchronized bookmark management program receiving user selections includes receiving user approval selections.

* * * * *